United States Patent [19]
Fitch

[11] 3,982,443
[45] Sept. 28, 1976

[54] POWER TAKE-OFF UNIT
[75] Inventor: Troy W. Fitch, Greenville, Tex.
[73] Assignee: Eagle Custom Manufacturing Company, Greenville, Tex.
[22] Filed: Jan. 20, 1975
[21] Appl. No.: 542,092

[52] U.S. Cl. .................................. 74/15.88; 74/11; 192/67 R
[51] Int. Cl.² .................... F16H 37/00; F16D 13/22
[58] Field of Search .............. 74/15.88, 15.8, 15.82, 74/15.84, 15.86, 15.4, 11, 15.2, 15.6, 15.63, 15.66, 15.69; 192/67 R

[56] References Cited
UNITED STATES PATENTS

| | | | |
|---|---|---|---|
| 1,480,021 | 1/1924 | Smith | 74/15.86 X |
| 1,587,205 | 6/1926 | Whitten | 74/15.88 |
| 2,100,677 | 11/1937 | Wagner | 74/15.86 X |
| 2,100,678 | 11/1937 | Wagner | 74/15.86 |
| 2,642,970 | 6/1953 | Szekely | 192/67 R X |
| 3,049,929 | 8/1962 | Wagner | 74/15.88 X |

*Primary Examiner*—Samuel Scott
*Assistant Examiner*—Lance W. Chandler
*Attorney, Agent, or Firm*—Howard E. Moore; Gerald G. Crutsinger

[57] ABSTRACT

A power take-off unit positionable in the drive line of an automobile or truck such that the unit is used to drive auxiliary equipment by a chain drive or V-belt and pulley attached to the power take-off shaft. The power take-off shaft has a gear engageable with a drive gear on the drive shaft of the power train. The drive shaft is engageable with a coupling which may be disengaged so that the power take-off shaft is capable of being turned without transmitting power to the wheels of the vehicle.

3 Claims, 1 Drawing Figure

POWER TAKE-OFF UNIT

BACKGROUND OF THE INVENTION

Many times it is desirable to use auxiliary equipment such as paint sprayers, chemical sprayers, air compressors, and other types of equipment requiring rotary power without the necessity of having to have a large auxiliary engine to drive same. On farms and in industry it is desirable to have a method to drive this equipment from an existing engine on a vehicle so as to utilize the power of a presently existing vehicle engine to thereby reduce the cost of equipment.

It is also desirable to be able to use the vehicle engine to drive the power take-off either when the vehicle is stopped or in motion.

SUMMARY OF THE INVENTION

I have devised a power take-off coupling which is adapted to fit in the drive line of a vehicle such as an automobile or pickup truck.

The power take-off unit has a drive gear rigidly secured to one end of an internally splined drive shaft in which an externally splined coupling shaft is slideably disposed between the drive shaft and driven end shaft such that the drive shaft may be disengaged from the coupling shaft so that only the forward portion of the drive shaft would rotate. The drive gear is engageable with a gear slideably disposed on a power take-off shaft. The power take-off shaft is rotatable with the gear by means of two keys, said power take-off shaft being adapted such that a gear or pulley may be secured to the opposite end thereof. The gear or pulley then drives the desired auxiliary equipment which may be mounted on the vehicle.

The primary object of the invention is to provide means for deliverying rotary power from the drive shaft to auxiliary equipment mounted on or adjacent the vehicle.

Another object of the invention is to provide rotary power when the vehicle is stationary or when the vehicle is moving.

Another object of the invention is to provide apparatus to utilize the direct power of the vehicle engine without the necessity of having an auxiliary engine.

A still further object of the invention is to provide a feasible method of coupling the power from the drive shaft to auxiliary equipment in an economical manner.

Other and further objects of the invention will become apparent upon reading the detailed description hereinafter following and the drawings annexed hereto.

DESCRIPTION OF THE DRAWING

The drawing of the preferred embodiment of the invention is annexed hereto so that the invention may be better and more fully understood, in which.

Numeral references are employed to designate like parts throughout the various figures of the drawing.

DESCRIPTION OF A PREFERRED EMBODIMENT

Figure 1:
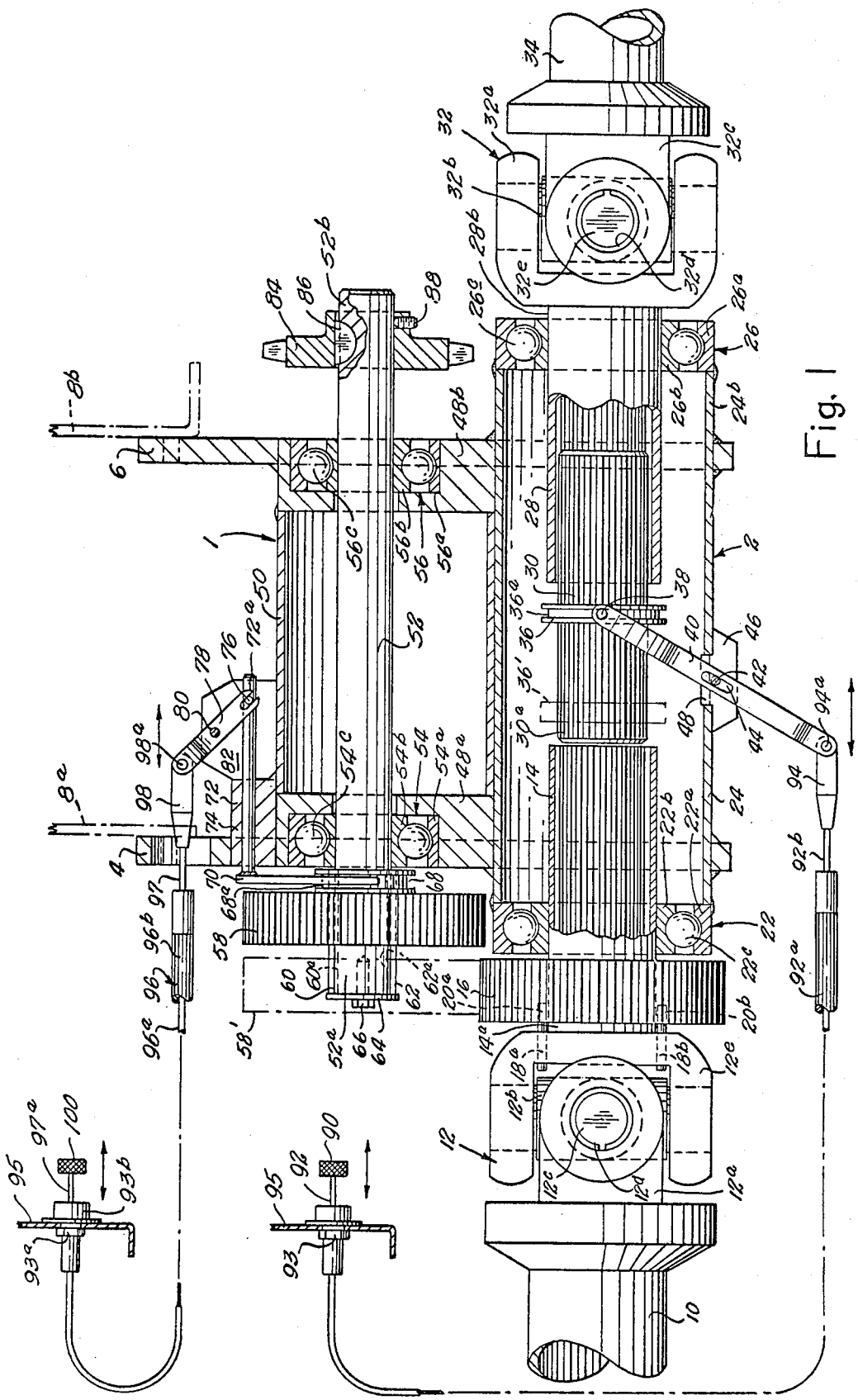
FIG. 1 is a partial fragmentary elevational view of the coupling and power take-off shaft.

Referring to the drawing, the numeral 1 refers to the power take-off assembly and the numeral 2 refers to the coupling assembly which are rigidly secured adjacent each other to mounting brackets 4 and 6 by welding or the like which may be secured to the portions of the vehicle frame 8a and 8b shown in dashed outline of the drawing.

A main shaft 10 is connected to the transmission of the vehicle (not shown) and is secured to a universal joint 12 comprising a yoke 12a secured to the spider journal 12b by means of bearing 12c and snap ring 12d. The spider journal 12b is secured to the yoke 12e which is rigidly secured to the end of a first hollow internally splined drive shaft 14 such that as the shaft 10 turns the U-joint 12 causes shaft 14 to rotate at the same speed.

End 14 a of hollow internally splined drive shaft 14 has a first drive gear 16 rigidly secured thereto by pins 18a and 18b journalled through yoke 12e into apertures 20a and 20b in gear 16. The shaft 14 is journalled through a bearing 22, having an outer race 22a and inner race 22b rotatably spaced by bearing balls 22c.

The bearing 22 is rigidly secured to a cylindrical housing 24 by means of welding or the like.

The opposite end 24b of the housing 24 has a similar bearing 26 having an outer race 26a and inner race 26b spaced apart by balls 26c and rotatably supporting a second driven shaft 28, which is internally splined to accept externally splined coupling shaft 30 as will be more fully explained hereinafter.

End 28b of the second driven shaft 28 is connected to a universal joint 32 having a yoke 32a connected to a spider journal 32b which is secured to yoke 32c by means of snap ring 32d and bearing 32e. Differential shaft 34 is connected to universal joint 32 and leads to the differential of the vehicle (not shown).

Coupling shaft 30 is externally splined and slideably disposed in internally splined end shaft 28. Coupling shaft 30 is slideably engageable with internally splined drive shaft 14 such that when end 30a of coupling shaft 30 is engaged in drive shaft 14, power from drive shaft 14 is transmitted to driven end shaft 28 to rotate shaft 28. A collar ring 36 is rigidly secured to coupling shaft 30 and has an annular groove 36a formed therearound to accept pin 38 which is slideably disposed in said groove 36a. Pin 38 is rigidly secured to a pivoted arm such as shifting fork 40, collar 36 thus may rotate relative to pin 38. When shifting fork 40 is pivoted about pin 42 the fork will move the shifting collar 36 to a position 36' shown in dashed outline engaging end 30a of coupling shaft 30 with the internally splined drive shaft 14. Shifting fork 40 is pivotally secured to housing 24 by means of pin 42 journalled through elongated hole 44 and rigidly secured to bracket 46 secured to housing 24. Shifting fork 40 extends through an elongated opening 48 through the wall of housing 24.

Power take-off assembly 1 is secured adjacent coupling assembly 2 and has end blocks 48a and 48b which are rigidly secured to a cylindrical housing 50 and mounting brackets 4 and 6 by means such as welding.

Power take-off shaft 52 is journalled through bearings 54 and 56 having internal races 54b and 56b rotatably spaced from external races 54a and 56a by balls 54c and 56c.

End 52a of power take-off shaft 52 has gear 58 keyed to and slideably disposed thereon to rotate therewith by means of keys 60 and 62 slideably disposed in key ways 60a and 62a. Gear 58 is retained on shaft 52 by retaining washer 64 rigidly secured to shaft 52 by means of nut 66 such that gear 58 may slide longitudinally along the keys 60 having longitudinal movement limited between washer 64 and end block 48a to engage and disengage from shaft 52. Gear 58 has a collar ring 68 secured thereto having an annular groove 68a formed thereabout. Shifting fork 70 is slideably disposed in groove 68a and is rigidly secured to push rod 72 which is slideably supported by block 74 rigidly secured to housing 50.

Push rod 72 has a pin 76 extending from end 72a engaging the bifurcated end of lever arm 78 which is pivotal about pin 80. Pin 80 is secured on bracket 82 extending from housing 50.

End 52b of shaft 52 extends outward from housing 50 such that a drive member such as a pulley or gear may be secured thereto. The embodiment illustrated has gear 84 rigidly secured to end 52b by key 86 and set screw 88 in order to drive auxiliary equipment requiring rotary power (not shown).

Operation of the hereinbefore described invention is as follows:

Assuming that shaft 10 is in a non-rotated position by virtue of the transmission being in neutral position or the vehicle engine being stopped, the coupling shaft 30 may be shifted to the position shown in full outline by pulling knob 90 outwardly. An actuator member such as cable 92 is secured to knob 90, the cable 92 having a shield 92a. Cable 92 is secured at one end by nut 93 to the dash of the vehicle 95 and is secured in the opposite end 92b to a coupling 94 which is secured to shifting fork 40 by means of pivot pin 94a. If it is desired that the vehicle be in motion while the power take-off is connected, knob 90 is pushed inward, pivoting shifting fork 40 such that end 30a of coupling shaft 30 engages the internally splined drive shaft 14.

Gear 58 of power take-off assembly 1 is shifted to position 58' to engage gear 16 by an actuator member such as a coaxial cable 96 having an internal cable 96a moveable in a shield 96b. Internal cable 96a is rigidly secured at end 97 to coupling 98 which is pivotally secured by means of pin 98a to lever arm 78. End 97a of internal cable 96a is secured to knob 100 and slideably extends inwardly through a fitting 93b to the vehicle dash 95 by means of nut 93a such that when knob 100 is pushed in, lever arm 78 is pivoted about pin 80, pushing push rod 72 toward the transmission end of the take-off assembly 1 and moving gear 58 to the position shown in 58' in dashed outline.

It should be readily apparent that when gear 58 is in the position 58' that rotation of drive shaft 10 is transferred to gear 58 thus driving shaft 52 through gear 58 which will impart motion to auxiliary equipment through a chain or V-belt attached to gear 84 or pulley (not shown) attached to shaft 52.

It should be readily apparent that gear 58 may be driven either with coupling shaft 30 engaged or disengaged from drive shaft 14 so that auxiliary equipment may be driven either while the vehicle is stationary or while the vehicle is in motion.

From the foregoing it should be readily apparent that the embodiment hereinbefore described accomplishes the objects of the invention hereinbefore described.

It should be appreciated that other and further embodiments of the invention may be devised without departing from the spirit and scope of the appended claims.

Having described my invention, I claim:

1. A power take-off unit adapted for mounting between the transmission and the drive shaft of a vehicle comprising: first and second hollow cylindrical housings; means securing said first housing to said second housing such that said first and second housings are parallel; a hollow internally splined drive shaft; a universal joint secured to one end of said drive shaft, a second end of said drive shaft extending into said first housing; a first bearing rotatably securing said drive shaft to said first housing; a drive gear secured to said drive shaft between said universal joint and said first housing; a hollow internally splined driven shaft; a universal joint secured to one end of said driven shaft, a second end of said driven shaft extending into said first housing, the second end of said driven shaft being spaced from the second end of said drive shaft; a second bearing rotatably securing said driven shaft to said first housing, said first and second bearings being arranged to maintain said drive shaft and said driven shaft in axial alignment; an externally splined coupling shaft; means secured to said coupling shaft for moving said coupling shaft between a first position wherein opposite ends of said coupling shaft extend into the second ends of said drive shaft and said driven shaft and a second position wherein one end of said coupling shaft is spaced from the second end of said drive shaft; a power take-off shaft; means rotatably securing said power take-off shaft in said second hollow cylindrical housing such that opposite ends of said power take-off shaft extend outwardly of opposite ends of the second housing; a driven gear secured to a first end of said power take-off shaft; and means to move said driven gear between a first position engaging said drive gear and a second position disengaged from said drive gear.

2. The combination called for in claim 1, said means secured to said coupling shaft for moving said coupling shaft between a first position and a second position comprising: a ring having an annular groove formed in the outer periphery thereof; means securing said ring to said coupling shaft; a shifting fork; means securing said shifting fork to said first housing, said shifting fork extending into said annular groove.

3. The combination called for in claim 2 with the addition of a cable secured to said shifting fork for moving said shifting fork.

* * * * *